US008422497B2

(12) United States Patent
Kang et al.

(10) Patent No.: US 8,422,497 B2
(45) Date of Patent: Apr. 16, 2013

(54) METHOD FOR CONFIGURING AND MANAGING MULTICAST DATA DELIVERY PATH IN MOBILE AD-HOC NETWORK AND MULTICAST DATA DELIVERY SYSTEM USING THE SAME

(75) Inventors: Nam-Hi Kang, Gwanak-gu (KR); Young-Han Kim, Seocho-gu (KR)

(73) Assignee: Soongsil University Research Consortium Techno-Park, Seoul (KR)

( * ) Notice: Subject to any disclaimer, the term of this patent is extended or adjusted under 35 U.S.C. 154(b) by 893 days.

(21) Appl. No.: 12/252,806

(22) Filed: Oct. 16, 2008

(65) Prior Publication Data

US 2010/0097971 A1    Apr. 22, 2010

(51) Int. Cl.
*H04L 12/28*    (2006.01)
(52) U.S. Cl.
USPC ........... 370/390; 370/230; 370/270; 370/312; 370/432
(58) Field of Classification Search .......... 370/229–231, 370/270, 312, 390, 432
See application file for complete search history.

(56) References Cited

U.S. PATENT DOCUMENTS

| 2003/0107992 A1* | 6/2003 | Garcia-Luna-Aceves et al. ............................. 370/230 |
| 2006/0250999 A1* | 11/2006 | Zeng et al. .................... 370/312 |
| 2007/0091805 A1* | 4/2007 | Ramprashad et al. ..... 370/230.1 |

OTHER PUBLICATIONS

Elizabeth M. Royer and Charles E. Perkins. 1999. Multicast operation of the ad-hoc on-demand distance vector routing protocol. In Proceedings of the 5th annual ACM/IEEE international conference on Mobile computing and networking (MobiCom '99). ACM, New York, NY, USA, 207-218.*
Perkins et al. Ad hoc On-Demand Distance Vector (AODV) Routing. The Internet Society. Network Working Group. RFC 3561. Jul. 2003.*

* cited by examiner

*Primary Examiner* — Hassan Kizou
*Assistant Examiner* — Ashil Farahmand
(74) *Attorney, Agent, or Firm* — Sherr & Jiang, PLLC

(57) ABSTRACT

A method for configuring and managing a multicast data delivery path in a wireless ad-hoc network and a multicast data delivery system using the same are disclosed. The method includes transmitting, by a parent node, first messages to respective child nodes, transmitting, by each of the child nodes, a second message to the parent node in response to the first message relayed by at least some of non-member nodes other than the parent node, performing an operation as a branch node by a non-member node receiving second messages belonging to the same multicast session and transmitted from different originators, and establishing, by the parent node receiving at least one second message, an Internet protocol (IP) tunnel with the originator of the received at least one second message. The performing of the operation as the branch node includes regarding the originators of the received second messages as child nodes, establishing IP tunnels connected to the respective child nodes, generating a new second message including an identifier (ID) of the branch node and IDs of the child nodes in an originator field and a child list field, respectively, and transmitting the generated second message to the parent node.

8 Claims, 5 Drawing Sheets

METHOD FOR CONFIGURING AND MANAGING MULTICAST DATA DELIVERY PATH IN MOBILE AD-HOC NETWORK AND MULTICAST DATA DELIVERY SYSTEM USING THE SAME

BACKGROUND OF THE INVENTION

1. Field of the Invention

The present invention relates to a method for configuring and managing a multicast tree in a wireless ad-hoc network and a multicast data delivery system using the same and, more particularly, but not exclusively, to a method for configuring an efficient multicast tree, a method for optimizing the multicast tree, and a multicast system using the methods.

2. Discussion of the Related Art

A mobile ad-hoc network (MANET) is capable of being auto-configured by mobile nodes without the aid of an infrastructure. For this reason, the MANET has attracted much attention as an underlying network for supporting ubiquitous computing environments and can be effectively applied not only to networking systems under special circumstances, for example, military operations and disaster areas, but also to community-based group communications, for example, network games and conferences.

A large amount of research has been conducted on applying a multicast system, which is an efficient transmission unit for group communication, to the MANET. However, since the MANET has restrictions, such as limited wireless communication resources and limited energy capacities of the mobile nodes, the restrictions need to be fully considered in order to apply multicast mechanism to the MANET.

Multicasting methods proposed to overcome the restrictions may be classified into a multicasting method provided in a network layer and a multicasting method provided in an application layer.

According to the network-layer multicasting method, all nodes of a network must manage the status of multicasting. In contrast, according to the application-layer multicasting method in which a virtual path is overlaid on an actual path, non-member nodes on a path relay multicast data, like unicast routers, without managing the status of multicasting. Accordingly, the latter method is much more efficient than the former method when there are many groups, nodes are very mobile, or a network undergoes big changes in membership.

However, since now known application-layer multicasting methods cannot sufficiently reflect actual physical network structures in generation of a virtual path, it is necessary to minimize redundant packet forwarding.

SUMMARY OF THE INVENTION

The present invention is directed to a method for configuring an efficient multicast tree, a method for optimizing the multicast tree, and a multicast system using the methods.

A first aspect of the present invention provides a method for configuring a multicast delivery path in a wireless ad-hoc network, the method including: broadcasting, by a member node corresponding to a source (hereinafter, referred to as "source member node"), a first message including an identifier (ID) of the source member node in a relay node field; receiving, by each of at least one member node other than the source member node, at least one first message relayed by at least some of member nodes other than the source member node, selecting an upstream member node based on the received at least one first message, and transmitting a second message to the selected upstream member node; and establishing, by the upstream member node receiving the second message, an Internet protocol (IP) tunnel with an originator of the second message, wherein the member node, which relays the first message, updates the first message by including an ID thereof in the relay node field of the first message and broadcasts the updated first message.

A second aspect of the present invention provides a method for managing a multicast delivery path in a wireless ad-hoc network, the method including: transmitting, by a parent node, first messages to respective child nodes; transmitting, by each of the child nodes, a second message to the parent node in response to the first message relayed by at least some of non-member nodes other than the parent node; performing an operation as a branch node by a non-member node receiving second messages belonging to the same multicast session and transmitted from different originators; and establishing, by the parent node receiving at least one second message, an Internet protocol (IP) tunnel with the originator of the received at least one second message, wherein the performing of the operation as the branch node comprises regarding the originators of the received second messages as child nodes, establishing IP tunnels connected to the respective child nodes, generating a new second message including an identifier (ID) of the branch node and IDs of the child nodes in an originator field and a child list field, respectively, and transmitting the generated second message to the parent node.

A third aspect of the present invention provides a multicast data delivery system for a wireless ad-hoc network, the system including: a source member node providing multicast data; ordinary member nodes receiving the multicast data from the source member node; at least one branch non-member node; and ordinary non-member nodes functioning as unicast transmitters, wherein each of the at least one branch non-member nodes transmits the multicast data through Internet protocol (IP) tunnels established with child nodes thereof, which include at least one of the ordinary member nodes and/or at least one other-branch non-member node, and wherein each of the source member node and the ordinary member nodes transmits the multicast data through IP tunnels established with at least one child node thereof, which includes at least one of the ordinary member nodes and/or at least one branch non-member node.

BRIEF DESCRIPTION OF THE DRAWINGS

The above and other objects, features and advantages of the present invention will become more apparent to those of ordinary skill in the art by describing in detail preferred exemplary embodiments thereof with reference to the attached drawings, in which.

DETAILED DESCRIPTION OF EXEMPLARY EMBODIMENTS

Figure 1:
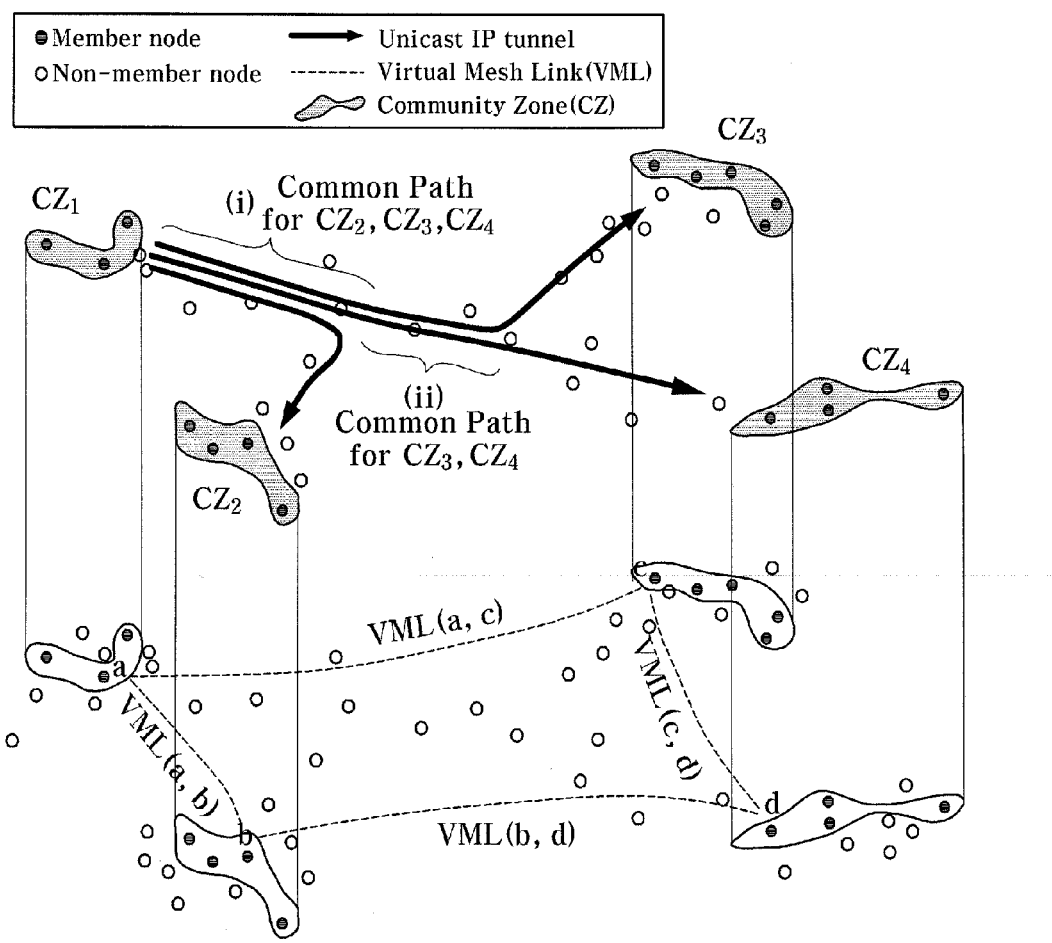
FIG. 1 is a conceptual diagram illustrating an example of a network environment in which community-based group communication is provided.

Since exemplary embodiments of the present invention are provided only for structural and functional descriptions of the present invention, the invention should not be construed as limited to the embodiments set forth herein. Thus, it will be clearly understood by those skilled in the art that the exemplary embodiments of the present invention may be embodied in different forms and include equivalents that can realize the spirit of the present invention.

The terminology used herein should be understood as follows.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

As used herein, the term "and/or" includes any and all combinations of one or more of the associated listed items. Thus, "first, second, and/or third items" not only includes a first, second, or third item but also means any and all combinations of one or more of the first, second, and third items.

It will be understood that when an element or layer is referred to as being "on", "connected to" or "coupled to" another element or layer, it can be directly on, connected to or coupled to the other element or layer or intervening elements or layers may be present. In contrast, when an element is referred to as being "directly on," "directly connected to" or "directly coupled to" another element or layer, there are no intervening elements or layers present. Meanwhile, spatially relative terms, such as "between" and "directly between" or "adjacent to" and "directly adjacent to" and the like, which are used herein for ease of description to describe one element or feature's relationship to another element(s) or feature(s) as illustrated in the figures, should be interpreted similarly.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components, and/or groups thereof, but do not preclude the presence or addition of one or more other features, integers, steps, operations, elements, components, and/or groups thereof.

Unless expressly defined in a specific order herein, respective steps described in the present invention may be performed otherwise. That is, the respective steps may be performed in a specified order, substantially at the same time, or in reverse order.

Unless otherwise defined, all terms (including technical and scientific terms) used herein have the same meaning as commonly understood by one of ordinary skill in the art to which this invention pertains. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

FIG. 1 is a conceptual diagram illustrating an example of a network environment in which community-based group communication is provided. It will be clearly understood by those skilled in the art that FIG. 1 illustrates only the example of the network environment to which an exemplary embodiment of the present invention is effectively applied, and the present invention is not limited to the network environment in which the community-based group communication is provided.

Referring to FIG. 1, nodes are illustrated with circles and some of the nodes belong to four community zones $CZ_1$, $CZ_2$, $CZ_3$, and $CZ_4$. A community zone refers to a region where a plurality of nodes are crowded. For example, a lecture room or a conference room may be a community zone.

A lower portion of FIG. 1 indicates an actual physical network, while an upper portion of FIG. 1 indicates a network overlaid by the physical network, which includes member nodes and unicast Internet protocol (IP) tunnels (hereinafter, IP tunnels). The member nodes (e.g., member nodes "a" and "b") may be connected to one another using a virtual mesh link and transmit data through an IP-in-IP tunnel. For more information, see "IP in IP tunneling," by W. Simpson, IETF RFC 1853, October 1995, incorporated herein by reference.

When there is a source (e.g., the member node "a") providing multicast data to the first community zone $CZ_1$, the source must transmit the multicast data to each of the second through fourth community zones $CZ_2$, $CZ_3$, and $CZ_4$. Referring to FIG. 1, it can be seen that there are common paths among a path between the first and second community zones $CZ_1$ and $CZ_2$, a path between the first and third community zones $CZ_1$ and $CZ_3$, and a path between the first and fourth community zones $CZ_1$ and $CZ_4$.

For example, since the same three multicast data are transmitted through a common path denoted by (i) to each of the second through fourth community zones $CZ_2$, $CZ_3$, and $CZ_4$, network resources are redundantly used. Specifically, according to a multicast transmission structure of FIG. 1, redundant transmission occurs, thus resulting in waste of the network resources and an increase in energy consumption of relaying nodes. As a result, network performance deteriorates.

Accordingly, in view of the above-described points, the present invention proposes an efficient method for minimizing use of network resources by reflecting the structure of a physical network in generation of a virtual path to the greatest extent.

Figure 2:
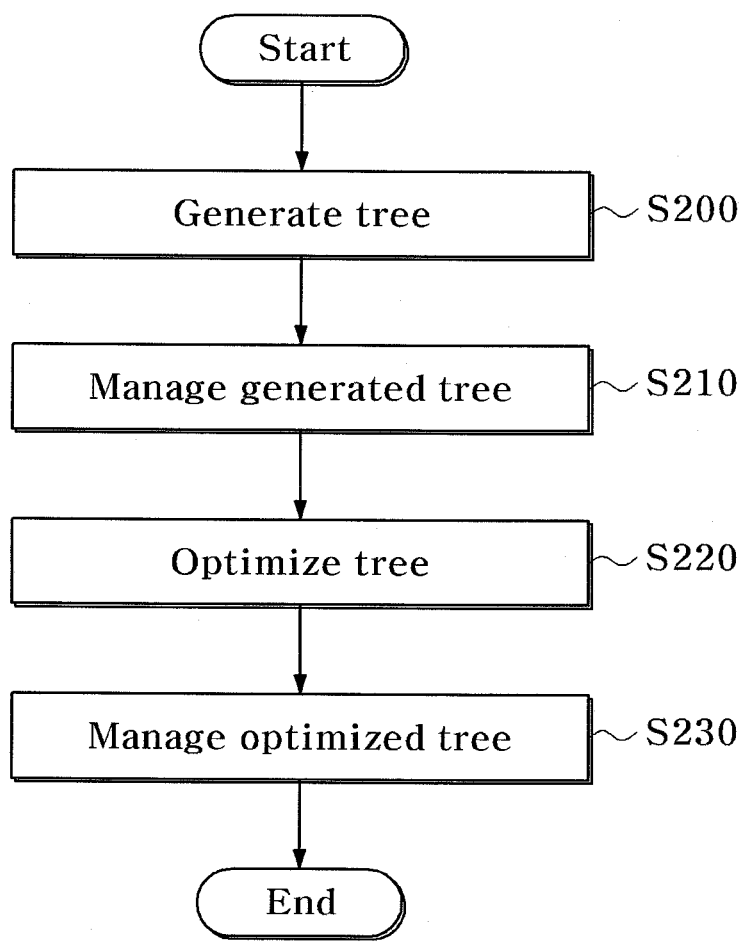
FIG. 2 is a flowchart illustrating a method for configuring and managing a multicast tree according to an exemplary embodiment of the present invention.

FIG. 2 is a flowchart illustrating a method for configuring and managing a multicast tree according to an exemplary embodiment of the present invention.

Referring to FIG. 2, the method may include step S200 of generating a tree, step S210 of managing the generated tree, step S220 of optimizing the tree, and step S230 of managing the optimized tree.

Exemplary embodiments of the present invention will be described herein assuming that multicast data is transmitted along a source-initiated tree.

First, step S200, according to an exemplary embodiment of the present invention, will now be described. For convenience, a tree prior to optimization will be referred to as a skeleton tree.

Figure 3:
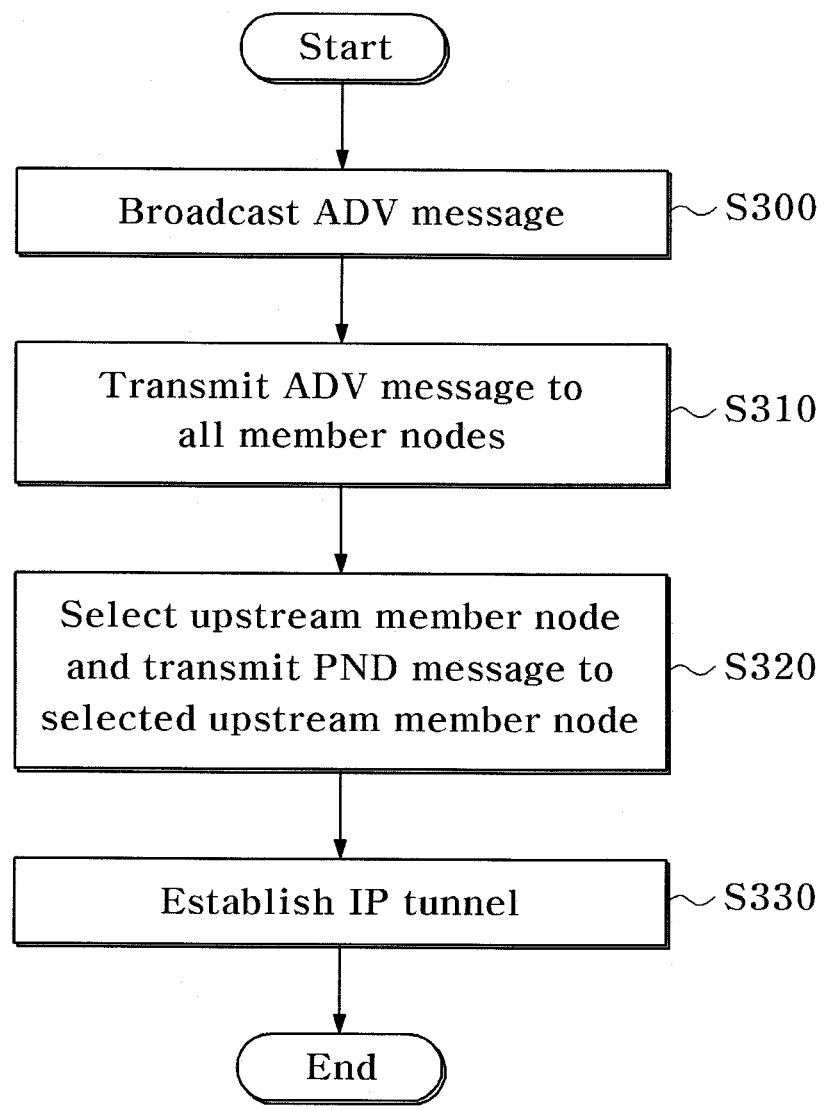
FIG. 3 is a flowchart illustrating a method for generating a skeleton tree according to an exemplary embodiment of the present invention.

FIG. 3 is a flowchart illustrating a method for generating a skeleton tree according to an exemplary embodiment of the present invention. In other words, FIG. 3 illustrates step S200 of FIG. 2, according to an exemplary embodiment of the present invention.

The method for generating the skeleton tree shown in FIG. 3 will now be described with reference to FIG. 1.

The method of FIG. 3 will be explained assuming that members of a multicast group are determined as shown in the lower portion of FIG. 1. In FIG. 3, "member of the multicast group" is a term including a node operating as a source of the multicast group (hereinafter, referred to as "source node") and a node attempting to join the corresponding multicast group (hereinafter, referred to as "newcomer").

For reference, an example of a method of determining the source node and the newcomer is as follows. A multicast service provider provides basic information to nodes (e.g., wireless stations) included in a network or users of the nodes, and the source node and the newcomer are determined by the initialization logic of the nodes or the users based on the provided basic information. The basic information may include, for example, initial values of channel names, group identifiers (GIDs), source IDs (SIDs), port numbers, and times to live (TTLs).

Referring to FIG. 3, in step S300, a source node (e.g., the node "a" of FIG. 1) broadcasts an advertisement (ADV) message to start generating a skeleton tree. In order to adapt a delivery tree to unpredictable changes in physical topology, the source node may periodically broadcast the foregoing ADV message. This will be described later with step S230.

According to an exemplary embodiment, the ADV message may include GIDs, sequence numbers (SeqNms), SIDs, relay node IDs (RNID), ADV TTLs, and distances to source (DstToSrcs). Here, GIDs, SeqNms, and SIDs may be used to distinguish redundant messages at an intermediate node. An ADV TTL indicates a TTL of an ADV message. Since the ADV message is transmitted in an IP packet format, TTLs according to the present exemplary embodiment include ADV TTLs and IP TTLs, which are TTLs included in IP headers.

According to an exemplary embodiment, an ADV TTL may be reduced by 1 each time the ADV message passes through a member node, while an IP TTL may be reduced by 1 each time the ADV message passes through a node.

In step S310, the ADV message is transmitted to all newcomers.

A method of finally relaying, by the intermediate node, the ADV message broadcasted by the source node to member nodes according to an exemplary embodiment of the present invention will now be described.

When receiving the ADV message, a non-member node only rebroadcasts the received ADV message. In contrast, when receiving the ADV message, a member node updates the ADV message and broadcasts the updated ADV message.

A method of updating the ADV message by the member node according to an exemplary embodiment of the present invention is as follows.

When receiving the ADV message, non-member nodes can obtain TTLs included in IP headers (i.e., IP TTLs). In contrast, when receiving the ADV message, member nodes N5, N7, N11, and N13 can obtain not only IP TTLs but also TTLs of the ADV message (i.e., ADV TTLs).

When receiving the ADV message, a member node may update an ADV TTL, calculate a DstToSrc, replace an ADV TTL field of the received ADV message, a DstToSrc field, and an RNID field with the updated ADV TTL, the calculated DstToSrc, and its own ID (e.g., IP address), and generate a new ADV message, namely, an updated ADV message.

An example of a method of calculating the DstToSrc may include subtracting an IP TTL of an IP package including the received ADV message from an initial IP TTL.

In step S320, each of the member nodes may select an upstream member node and transmit a parent node designation (PND) message to the selected upstream member node.

A method of selecting an upstream member node according to an exemplary embodiment of the present invention is as follows.

When receiving only one ADV message, a member node may select an originator of the ADV message (i.e., a member node corresponding to the RNID of the ADV message) for the upstream member node.

When receiving a plurality of ADV messages corresponding to the same multicast session, a member node may select a parent node in consideration of at least some of the DstToSrc, the number of IP tunnels, and a distance to the parent node. That is, the member node may select a received ADV message of the plurality of ADV messages through the most suitable path for at least one of the three points and select an originator of the selected ADV message (i.e., a member node corresponding to the RNID of the selected ADV message) as the upstream member node.

A method of selecting an ADV message according to an exemplary embodiment of the present invention is as follows.

When receiving each ADV message, the corresponding member node may calculate the length of a path through which the ADV message is transmitted, the number of IP tunnels to be generated on the path, and a distance to a member node corresponding to a relay node field and select a first message, which passes through the shortest path, allows the smallest number of IP tunnels to be generated on the path, and has the shortest distance to the parent node, according to the order of priority determined beforehand from among the length of the path, the number of 1P tunnels to be generated on the path, and the distance to the parent node. For example, when the length of the path has priority over the number of IP tunnels, the corresponding member node may select an ADV message which passes through the shortest path. However, when at least two ADV messages pass through the shortest path, the member node may select an ADV message with the smallest number of IP tunnels.

An example of a method of calculating the number of IP tunnels may include subtracting an ADV TTL included in the received ADV message from an initial ADV TTL.

A method of calculating the DstToSrc is the same as described in step S310.

An example of a method of calculating the distance to the parent node may include subtracting, by the corresponding member node, a DstToSrc field included in the received ADV message from a distance between the member node and the source node.

In step S330, when receiving the PND message, the member node may establish an IP tunnel with an originator of the PND message. Specifically, the member node may register a member node corresponding to the originator of the PND message as its own child node and operate as a parent node to establish an IP tunnel with the registered child node. A process of establishing the IP tunnel and a process of transmitting a packet using the established IP tunnel are already known in the disclosure of IP-in-IP tunneling and thus, a description thereof will be omitted here.

As a result, a skeleton tree is generated. Hereinafter, step S210, according to an exemplary embodiment of the present invention, will be described.

The generated skeleton tree may be expanded by the joining of new member nodes. A newcomer may broadcast a join request (JREQ) message in order to discover its own parent node on the skeleton tree. When receiving the JREQ message, a member node may transmit a join response (JREP) message to an originator of the JREQ message. When receiving a plurality of JREP messages, the originator of the JREQ message may select one of the JREP messages. An example of a method of selecting one of JREP messages may be performed based on the same principles as the method of selecting the ADV message as described in step S320. Thereafter, the member node may transmit a PND message to an originator of the selected JREP message, that is, a parent node. This results in the establishment of an IP tunnel between the member node and the parent node.

Step S220, according to an exemplary embodiment of the present invention, is as follows.

Figure 4:
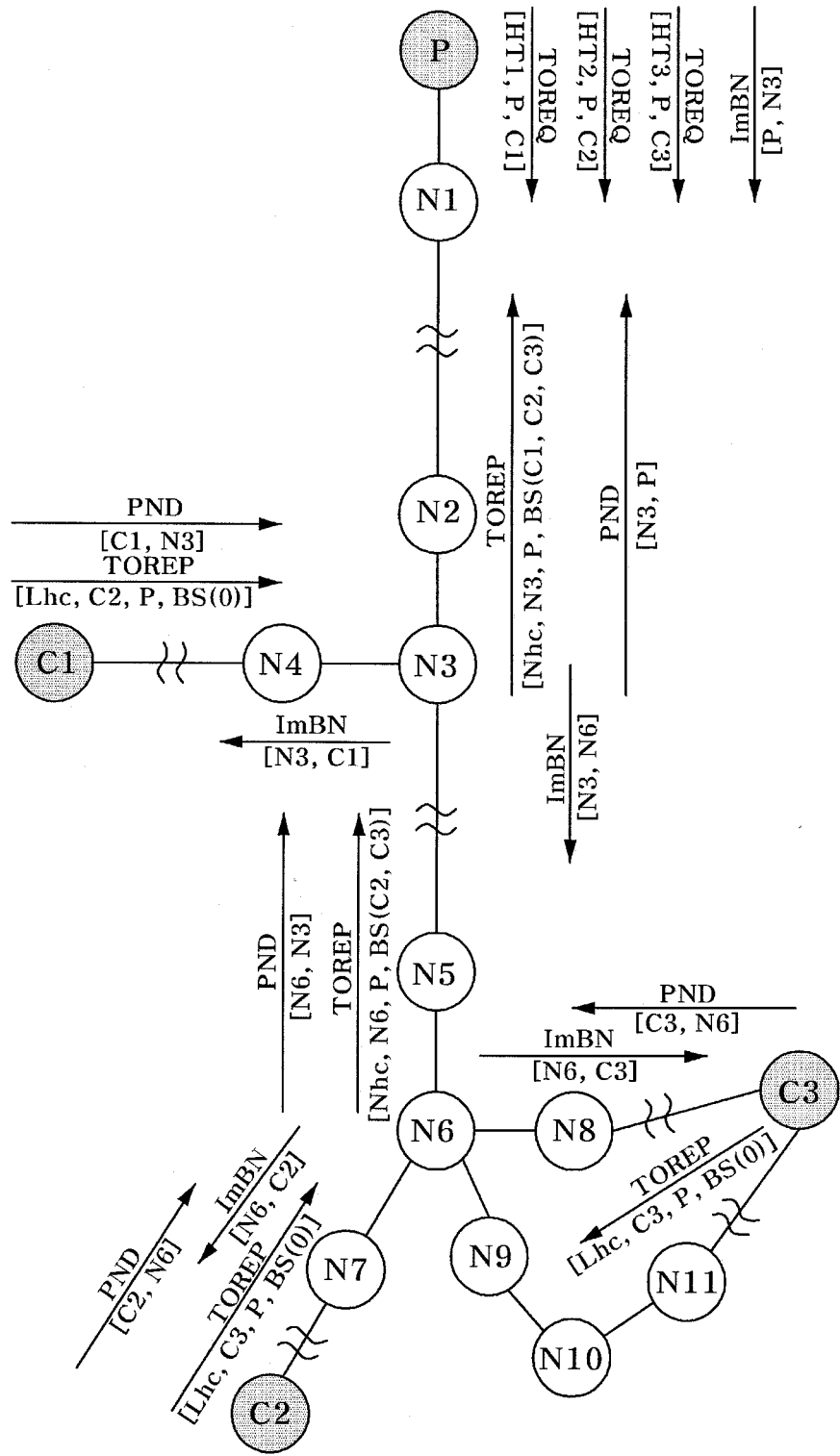
FIG. 4 schematically illustrates distribution of nodes for explaining a process of optimizing a tree according to an exemplary embodiment of the present invention.

FIG. 4 schematically illustrates distribution of network devices (i.e., nodes) for explaining a process of optimizing a tree according to an exemplary embodiment of the present invention. For convenience, FIG. 4 illustrates a portion of a multicast tree, that is, a single-level tree configured with a single parent node P and three child nodes C1, C2, and C3. However, it will be clearly understood by those skilled in the art that FIG. 4 is only an example for explaining the exemplary embodiment of the present invention, and the present invention is not limited thereto and can be applied regardless of the number of nodes, the structure of a generated skeleton tree, the number of parent nodes, and the number of child nodes.

In FIG. 4, shaded circles and white circles denote member nodes and non-member nodes, respectively. Also, in FIG. 4, lines represent links capable of single-hop transmission, and lines indicated by "~" represent paths on which there are many intermediate non-member nodes.

Figure 5:
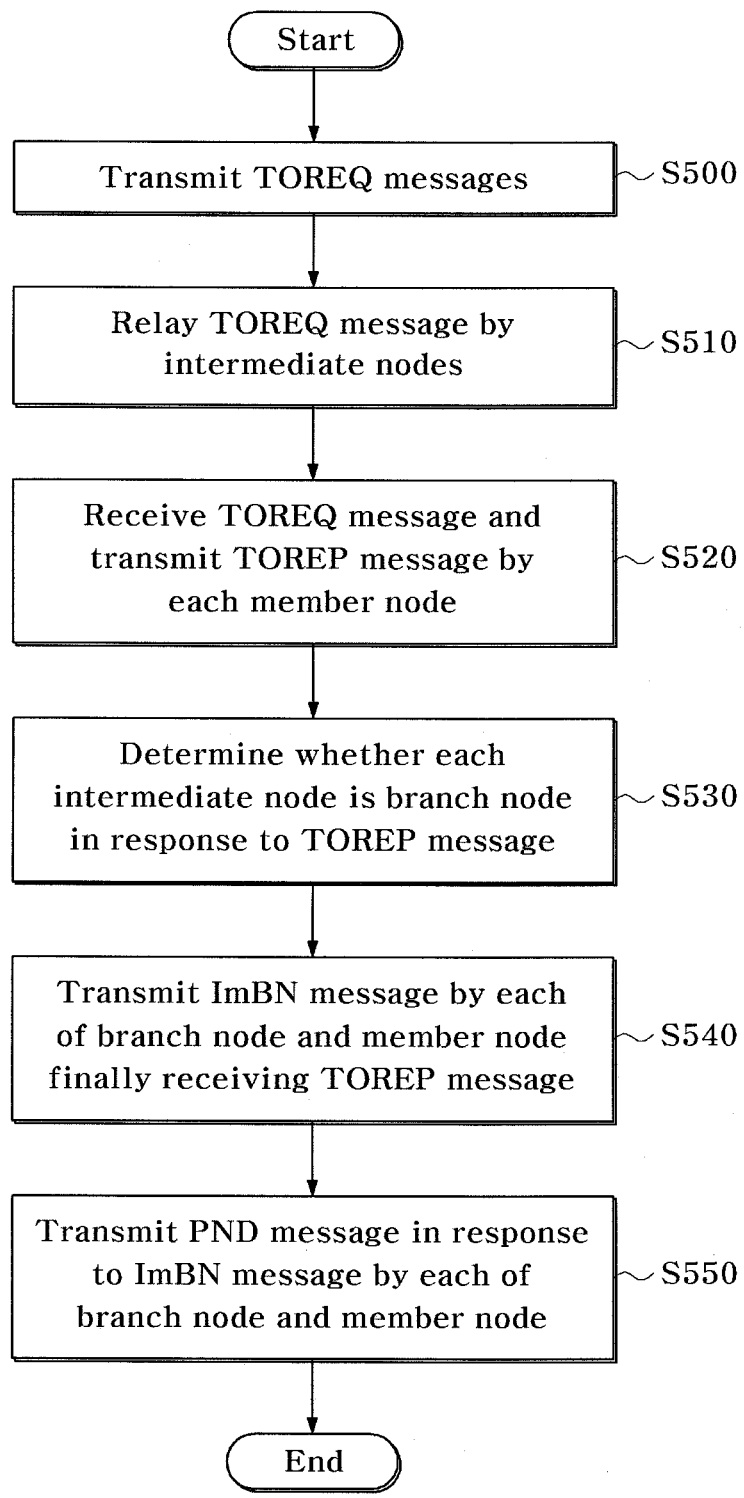
FIG. 5 is a flowchart illustrating a method for optimizing a tree according to an exemplary embodiment of the present invention.

FIG. 5 is a flowchart illustrating a method for optimizing a tree according to an exemplary embodiment of the present invention. In other words, FIG. 5 illustrates step S220 of FIG. 2, according to an exemplary embodiment of the present invention.

The method for optimizing the tree shown in FIG. 5 will now be described with reference to FIG. 4.

In step S500, the parent node P may transmit a tunnel optimization request (TOREQ) message to each of the child nodes C1, C2, and C3 to start a tree optimization procedure. According to an exemplary embodiment, the parent node P may transmit three different TOREQ messages to each of the child nodes C1, C2, and C3.

According to an exemplary embodiment, the TOREQ message may include a GID, SeqNm, a holding time (HT), an originator, and a target node. The GID and SeqNm are used for a redundant message test as in the process of generating the skeleton tree. In FIG. 4, the GID and SeqNm are omitted for convenience.

Referring to FIG. 4, an originator field and a target node field of the TOREQ message heading for a member node N9 may include an ID (e.g., IP address) of the parent node P and an ID (e.g., IP address) of one of the child nodes C1, C2, and C3, respectively.

According to an exemplary embodiment, an HT field may include TOREQ TTL, a distance "hc" to the target node converted into hop counts, and a one-hop delay $\delta$. Since the distance "hc", i.e., a distance between the parent node P and the corresponding one of the child nodes C1, C2, and C3, is determined in the process of establishing the IP tunnel between two nodes, which is included in step S200, the distance "hc" is already known to the parent node P. The HT field may be used to determine points in time when a tunnel information cache (TIC), a temporary cache, is deleted and expires when the TOREQ message is received. A deletion time and expiration time will be described later.

In step S510, when receiving the TOREQ message, intermediate non-member nodes N1, N2, ..., and N11 may relay such that the received TOREQ message is transmitted to the corresponding target node while storing information obtained from the received TOREQ message in the TIC and calculating a deletion point in time of each of entries of the TIC.

That is, the intermediate non-member nodes N1, N2 ..., and N11 located on the paths from the parent node P and the respective child nodes N5, N9, and N11 store information obtained from the received TOREQ message in the TIC. The obtained information may include, for example, a relationship between the parent node P and each of the child nodes N5, N9, and N11, GID, and SeqNm. For example, the non-member node N5 may store information on the receipt of the TOREQ message heading from the parent node P to the child node C2 and information on the receipt of the TOREQ message heading from the parent node P to the child node C3 as respective entries of the TIC and calculate a deletion point in time of the corresponding one of the entries, based on an HT field of the corresponding TOREQ message.

According to an exemplary embodiment, the deletion point in time of the corresponding entry may correspond to a point in time when a TTL of the corresponding entry elapses after the corresponding TOREQ message is received. Here, a round trip time (RTT) ($=2*\delta*hc$) between an originator of the corresponding message and a target node may be taken as an example of the TTL of the corresponding entry, but the present invention is not limited thereto. The values $\delta$ and "hc" may be directly obtained from the HT field. When the value $\delta$ is a predetermined value, a $\delta$ field may be omitted from the HT field.

As a result, the respective TOREQ messages may reach the corresponding target nodes C1, C2, and C3.

In step S520, when receiving the TOREQ message, each of the child nodes C1, C2, and C3 may transmit a tunnel optimization response (TOREP) message to the originator (i.e., the parent node P) of the TOREQ message.

According to an exemplary embodiment, the TOREP message may include a GID field, an SeqNm field, a largest hop-count field, an originator field, a target node field, and a branch status (BS) field. In FIG. 4, GID and SeqNm are omitted for convenience.

Each of the child nodes C1, C2, and C3 may add the GID and SeqNm included in the received TOREQ message to the corresponding fields of the TOREP message, add all "0" values to the BS field of the TOREP message, and add a "0" value to an Lhc field of the TOREP message to generate the TOREP message. Thereafter, each of the child nodes C1, C2, and C3 may transmit the generated TOREP message. The Lhc field is increased by 1 each time the corresponding TOREQ message passes through a node.

In step S530, each of the intermediate non-member nodes N1, N2, ..., and N11 may determine whether a plurality of TOREP messages belonging to the same multicast session are received up to the expiration point in time. Here, the latest one of the deletion points in time of the entries may be taken as an example of the expiration point in time. An example of a method of determining whether the TOREP messages belong to the same multicast session may include determining whether the GID and SeqNm fields of the corresponding TOREP message are stored in the TIC. Thereafter, when receiving a plurality of TOREP messages belonging to the same multicast session up to the expiration point in time, each of the intermediate non-member nodes N3 and N6 may determine itself as a branch node and operate as the branch node. In this case, the remaining intermediate non-member nodes N1, N2, N4, N5, N7, ..., and N11 may relay such that the received TOREP message can be transmitted to the originator (i.e., the parent node P) of the corresponding TOREQ message.

Each of the intermediate non-member nodes N3 and N6 (i.e., branch non-member nodes) determined as the branch nodes may generate a new TOREP message and relay such that the new TOREP message can be transmitted to the originator (i.e., the parent node P) of the corresponding TOREQ message.

An example of a method for generating the new TOREP message may include generating a new TOREP message into which a plurality of TOREP messages belonging to the same multicast session are merged and transmitting the new TOREP message to the originator of the corresponding TOREQ message. Here, the merged new TOREP message may include a list of child nodes in its BS field.

In step S540, each of the branch non-member nodes N3 and N6 and the member node (i.e., the parent node P) that finally receives the TOREP message may regard originators of the received TOREP messages as child nodes and transmit an ImBN message to each of the child nodes in order to establish an IP tunnel to be connected to each of the child nodes. For instance, the branch non-member node N3 may transmit an ImBN message to each of the member node C1 and the branch non-member node N6.

Meanwhile, the branch non-member node N6 may receive two TOREP messages from the member node C3 through two paths. In this case, the branch non-member node N6 may select a TOREP message with a lower Lhc value of the two TOREP messages and transmit an ImBN message to a path through which the selected TOREP message is received. This results in the establishment of an IP tunnel with a short physical path between the non-member node N6 and the member node C3.

In step S550, when receiving the ImBN message, each of the member nodes C1, C2, and C3 and the branch non-member nodes N3 and N6 may transmit a PND message in response to the received ImBN message and establish a new IP tunnel.

In the above-described process, although the number of IP tunnels is increased from 3 to 5, since a redundant path for data of the same multicast session is excluded, network performance can be improved.

Step S230, according to an exemplary embodiment of the present invention, will now be described.

A multicast data transmission tree needs to be reconfigured every time a following event occurs. For example, the event may be a change in the status of a membership (join or leave), a change in the status of a branch node (e.g., the movement or system-off of the branch node), or the movement of intermediate nodes located on a transmission path.

When an event "join" occurs, the multicast tree may be managed as follows. During group communication, a new node attempting to join a group, that is, a newcomer, may transmit a JREQ message. The newcomer may previously obtain setup information on a multicast session from an ADV message or an announcement of a source (e.g., webpage). Like a tree generation procedure, the newcomer may select the most suitable one of a plurality of JREP messages received from respective member nodes and/or branch nodes, transmit a PND message to an originator of the selected JREP message, and establish a tunnel.

When an event "leave" occurs, the multicast tree may be managed as follows. A member node attempting to leave a group may expressly transmit a LEAVE message to its parent node and child nodes. In this case, the following two embodiments may be embodied.

First, the LEAVE message includes routing information used by the member node attempting to leave the group. The routing information allows its parent node and child nodes to immediately establish IP tunnels therebetween.

Second, when receiving the LEAVE message, each of the child nodes may begin a parent discovery process again.

Similarly, when receiving the LEAVE message, a branch node may have only one child node. In this case, the branch node becomes an ordinary non-member node.

When a node moves or leaves a group without any announcement, link breakage may occur. In order to adapt to link changes, a parent node and child nodes may periodically exchange group hello messages with each other. When an intermediate node leaves far away from a multicast tree, breakage of IP tunnels occurs. As a result, nodes sense that group hello messages cannot be received from each other, and attempt to reestablish IP tunnels.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

The above-described exemplary embodiments of the present invention may have the following advantages. However, all the following advantages should not be interpreted as being present in all the embodiments of the present invention, and are not intended to limit the scope of the present invention.

According to an exemplary embodiment of the present invention, a multicast tree can be efficiently configured in consideration of a distance to source, the number of IP tunnels, and a distance to a parent node.

According to an exemplary embodiment of the present invention, since a multicast tree can be optimized while excluding a redundant path in consideration of a physical network structure, network efficiency can be enhanced.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method comprising configuring a multicast delivery path in a wireless ad-hoc network, wherein the method comprises:
broadcasting, by a source node, first messages to intermediate nodes,
the first messages including an information of the source node in a relay node field,
the information comprising an identifier, routing information, and times to live (TTL), and the relay node field comprises information related to a plurality of member nodes and non-member nodes;
receiving by the member nodes other than the source node at least one of the first messages relayed by at least one of the intermediate nodes;

selecting an upstream member node upon detection of receipt of the first messages, wherein selecting the upstream member node comprises:

calculating the length of a path through which each of said the at least one of the first messages is transmitted, a number of IP tunnels to be generated, and a distance to a member node corresponding to the relay node field is calculated;

selecting one of the at least one of the first messages according to the calculation by selecting a first message which passes through the shortest path, providing the smallest number of IP tunnels to be generated, and generating the shortest distance to the respective member nodes corresponding to the relay node field according to a priority from among the length of the path, the number of IP tunnels to be generated, and the distance to the respective member nodes corresponding to the relay node field; and selecting the upstream member node corresponding to the relay node field of the selected first message, transmitting second messages to the selected upstream member node; and establishing, by the upstream member node, an Internet protocol (IP) tunnel with an originator of at least one of the second messages, wherein in response to detection of relaying the first messages by the intermediate nodes, at least one of the first messages by updating the information of the source node in the relay node field corresponding to the at least one of the first messages and broadcasts the modified at least one of the first messages.

2. The method of claim 1, wherein said selecting the upstream member node comprises:

selecting a first message, which passes through the shortest path from the source node to a corresponding member node, from the received at least one of the first messages; and selecting a member node corresponding to a relay node field of the selected first message as the upstream member node.

3. The method of claim 1, wherein said selecting of the upstream member node comprises:

calculating the length of a path through which the at least one of the first messages is transmitted and a number of IP tunnels to be generated;

selecting at least one of the first messages based on the calculation; and selecting a member node corresponding to the relay node field of the selected first message as the upstream member node.

4. The method of claim 3, wherein said selecting the upstream member node comprises selecting a first message, which passes through the shortest path from the source node and a corresponding member node, from said the received at least one of the first messages, wherein when at least two of the first messages pass through the shortest path, a first message with the smallest number of IP tunnels is selected from the received at least one of the first messages.

5. The method of claim 1, wherein the updating information comprises:

calculating the TTL of at least one of the first messages and updating the at least one of the first messages by adding the calculated TTL to the TTL field of the at least one of the first messages; and selecting the upstream member node by calculating a number of IP tunnels corresponding to the at least one of the member nodes based on the calculated TTL field of the at least one of the first messages.

6. The method of claim 1, wherein:

the at least one of the first messages comprises a TTL field and a distance-to-source field;

a member node which receives the at least one of the first messages is configured to calculate TTL and a distance to source based on the at least one of the first messages and to update the at least one of the first messages by adding the calculated TTL and distance to source to the TTL field and distance-to-source field of the at least one of the first messages; and the selecting of the upstream member node comprises calculating by a number of IP tunnels and distances corresponding to the member nodes based on the TTL field and distance-to-source field of the at least one of the first messages.

7. The method of claim 1, wherein the member nodes are configured to detect both an IP TTL and TTLs of the at least one of the first messages and non-member nodes are configured to detect only the IP TTL.

8. The method of claim 7, wherein the member nodes are configured to update the TTL of the at least one of the first messages by calculating the routing information, to replace the TTL of the at least one of the first messages, a DstToSrc field, and an relay node ID (RNID) field with the at least one of the second messages, and to generate the updated one of the second messages.

* * * * *